United States Patent [19]
Stråhlin

[11] Patent Number: 5,758,132
[45] Date of Patent: May 26, 1998

[54] CLOCK CONTROL SYSTEM AND METHOD USING CIRCUITRY OPERATING AT LOWER CLOCK FREQUENCY FOR SELECTING AND SYNCHRONIZING THE SWITCHING OF HIGHER FREQUENCY CLOCK SIGNALS

[75] Inventor: Karl Gunnar E. Stråhlin, Stockholm, Sweden

[73] Assignee: Telefonaktiebolaget LM Ericsson, Stockholm, Sweden

[21] Appl. No.: 413,857

[22] Filed: Mar. 29, 1995

[51] Int. Cl.⁶ .................. G06F 1/06; G06F 1/12
[52] U.S. Cl. .............. 395/556; 395/553; 395/182.09; 326/93
[58] Field of Search ............... 328/154, 73; 340/172.5, 340/825.5; 368/119; 364/200, 900; 395/500, 200.1, 575, 551, 555, 556, 553, 182.09; 307/269, 475, 517; 375/357, 108, 121, 107; 370/55.9; 327/145; 326/93

[56] References Cited

U.S. PATENT DOCUMENTS

| | | | |
|---|---|---|---|
| 3,539,933 | 11/1970 | White et al. | 328/154 |
| 3,810,121 | 5/1974 | Chang et al. | 340/172.5 |
| 4,254,475 | 3/1981 | Cooney et al. | 364/900 |
| 4,254,492 | 3/1981 | McDermott, III | 368/119 |
| 4,354,230 | 10/1982 | Murphy et al. | 364/200 |
| 4,398,155 | 8/1983 | Atwell, Jr. et al. | 328/73 |
| 4,674,036 | 6/1987 | Conforti | 364/200 |

(List continued on next page.)

FOREIGN PATENT DOCUMENTS

| | | |
|---|---|---|
| 0 249 128 | 12/1987 | European Pat. Off. |
| 35 17 662 A1 | 11/1986 | Germany |
| 4-24860 | 1/1992 | Japan |
| WO A81/00925 | 4/1981 | WIPO |
| WO A86 004239 | 1/1986 | WIPO |
| WO A94/18622 | 1/1994 | WIPO |

OTHER PUBLICATIONS

IBM Technical Disclosure Bulletin, vol. 4, No. 12, May 1962, pp. 41–42, "Computer Clock Synchronization", by R.C. Boden.

*Primary Examiner*—Dinh C. Dung
*Attorney, Agent, or Firm*—Nixon & Vanderhye P.C.

[57] ABSTRACT

First and second parallel processors operate in one of plural modes including synchronous and stand-alone modes. Each processor includes a clock for selectively providing a first high frequency clock signal to both processors. Each processor also includes electronic circuitry operating at a second frequency lower than the first frequency which generates a clock selection signal that selects one of the clocks from the first and second processors to clock both processors. The electronic circuitry, in response to mode change signals, generates clock switching control signals at the lower frequency. The lower frequency clock control signals are reclocked so that they are synchronous with the first frequency clock signals before being used to select one of the clocks.

25 Claims, 7 Drawing Sheets

U.S. PATENT DOCUMENTS

| | | | |
|---|---|---|---|
| 4,677,433 | 6/1987 | Catlin et al. | 340/825.5 |
| 4,819,164 | 4/1989 | Branson | 364/200 |
| 4,899,351 | 2/1990 | Bonke | 375/108 |
| 4,987,578 | 1/1991 | Akins et al. | 375/121 |
| 5,023,487 | 6/1991 | Wellheuser et al. | 307/475 |
| 5,086,387 | 2/1992 | Arroyo et al. | 395/550 |
| 5,115,503 | 5/1992 | Durkin | 395/550 |
| 5,136,180 | 8/1992 | Caviasca et al. | 307/269 |
| 5,146,585 | 9/1992 | Smith, III | 395/550 |
| 5,155,380 | 10/1992 | Hwang et al. | 307/269 |
| 5,191,581 | 3/1993 | Woodbury et al. | 370/85.9 |
| 5,197,126 | 3/1993 | Harrell | 395/200 |
| 5,227,672 | 7/1993 | Sawtell | 307/269 |
| 5,249,206 | 9/1993 | Appelbaum et al. | 375/107 |
| 5,274,678 | 12/1993 | Ferolito et al. | 375/108 |
| 5,287,492 | 2/1994 | Reynders | 395/575 |
| 5,291,528 | 3/1994 | Vermeer | 375/106 |
| 5,294,842 | 3/1994 | Iknaian et al. | 307/269 |
| 5,315,181 | 5/1994 | Schowe | 307/480 |
| 5,319,771 | 6/1994 | Takeda | 395/550 |
| 5,329,188 | 7/1994 | Sikkink et al. | 307/517 |
| 5,389,838 | 2/1995 | Orengo | 326/93 |
| 5,422,915 | 6/1995 | Byers et al. | 375/357 |
| 5,467,465 | 11/1995 | Chen | 395/550 |
| 5,475,324 | 12/1995 | Tomiyori | 327/145 |
| 5,485,602 | 1/1996 | Ledbetter, Jr. et al. | 35/550 |
| 5,530,726 | 6/1996 | Ohno | 375/357 |

| STATE | OUTPUT | | |
|---|---|---|---|
| | S1 | S2 | S3 |
| SEP1 | 0 | 1 | 0 |
| SEP2 | 0 | 0 | 0 |
| ⋮ | | | |
| SEP12 | 0 | 0 | 0 |
| EX 1 | 1 | 1 | 0 |
| EX 2 | 0 | 0 | 0 |
| ⋮ | | | |
| EX 5 | 0 | 0 | 0 |
| EX 6 | 0 | 0 | 1 |
| Sb 1 | 0 | 0 | 1 |
| ⋮ | | | |
| Sb 10 | 0 | 0 | 1 |
| Sb 11 | 0 | 1 | 0 |
| Sb 12 | 0 | 1 | 0 |
| Sb 13 | 0 | 1 | 0 |
| Sb 14 | 0 | 1 | 0 |

CLOCK CONTROL SYSTEM AND METHOD USING CIRCUITRY OPERATING AT LOWER CLOCK FREQUENCY FOR SELECTING AND SYNCHRONIZING THE SWITCHING OF HIGHER FREQUENCY CLOCK SIGNALS

TECHNICAL FIELD OF THE INVENTION

The present invention relates to a clock control system and method, and more particularly, to the control of high frequency clocking signals using lower frequency control signals.

BACKGROUND AND SUMMARY OF THE INVENTION

A variety of data processing applications use parallel processors which operate together in a synchronous mode of operation. Synchronously operating parallel processors provide system redundancy and therefore high reliability. If one processor is faulty, another processor may continue to perform the system control operations in a stand-alone mode of operation. When the faulty processor is repaired, it can be brought back on line to resume parallel synchronous operation. To perform in stand-alone operation, each processor must have its own oscillator or clock. In synchronous operation, only one of the processor clocks, however, is used at one time to provide the clocking signals actually used by the parallel processors. Even if there is some phase delay between the processors, e.g., one of the processors operates N clock signals ahead of the other processor, using the same clocking signal to drive the parallel processors ensures synchronous operation.

In the example of two parallel processors A and B, there are several operational states or modes in which those processors must be able to operate. First, with processors A and B operating in parallel and synchronously, processor A operates as an "executive" processor meaning that it operates N cycles ahead of "standby" processor B. The clock oscillator in executive processor A provides clock signals that drive both processor A and processor B. The clock oscillator in processor B is on standby in the sense that it is not currently used but could be used if needed, i.e., a clock switch occurs. Second, with processors A and B operating in parallel and synchronously, processor B operates as the executive processor meaning that it operates N clock cycles ahead of processor A. Accordingly, the oscillator in executive processor B provides clock signals to both processors. Third, both processors A and B must be capable of running independently of the other processor using their own oscillators in a "stand-alone" mode or state.

Irrespective of operational mode, it is desirable that both processors transition between each of these three states as effectively and as quickly as possible so that the impact on the system being controlled by the processors is minimized. For example, when transitioning between the first and second parallel synchronous states described above, both processors must now switch to running off processor B's clock signal rather than the clock signal from processor A. In addition, processor B, which was previously N cycles behind processor A, must now operate N cycles ahead of processor A. To minimize system impact, the transition should occur without error and with minimal delay.

Another problem with such state transitions is that the parallel processors operate using a high frequency clock signal that may be much faster than the control signals used to control the clock switching necessary to transition between the various operational states of the processors. For example, such state transition control signals may be generated by a "state machine" implemented using discrete logic circuitry or other hardware clocked at a considerably lower frequency. The added difficulty then is that of synchronizing the substantially lower frequency state control signals used to effect the clock switching transitions with the much higher frequency clocking outputs which drive the parallel processors A and B. This synchronization process should occur very rapidly (e.g., on the order of several nanoseconds or less if possible), to minimize the time required to make the various clock switching transitions.

SUMMARY OF THE INVENTION

The present invention provides a method and apparatus for controlling clock switching operations between parallel devices efficiently and accurately. Moreover, the present invention performs such clock switching operations between high speed clocks using relatively low speed control signals.

First and second clock signals are generated at a first frequency and a clock selection signal is generated at a second, lower frequency. The lower frequency clock selection signal is synchronized with the first frequency clock signals and then used to select one of the clock signals. Advantageously, the present invention synchronizes the slower clock selection signal with the faster clock signals in several nanoseconds or less.

The present invention describes an example method for operating first and second parallel processors in plural modes. Each processor includes its own independent high speech clock which may be selectively connected to supply high speed clocking signals to both processors. Each processor also includes its own clock switching circuitry for selecting which of the high speed clocking signals actually clocks that processor in a particular mode/state. Initially, the first processor may be designated to provide the high speed clocking signal to both the first and second processors using the first processor's clock with the first and second processors operating synchronously. When the mode of operation changes, control signals are provided to the clock switching circuitry in both processors indicating the need to perform a clock switching operation, e.g., the second processor is to provide the high speed clocking signal rather than the first processor. The control signals are processed in the clock switching circuitry of each processor at a speed substantially slower than the high speed clocking signal. Slower speed clock select signals are produced which select the high speed clocking signal from the second processor to clock both processors.

Apparatus in accordance with the present invention includes first and second clocks that provide a first frequency clock signal. Electronic circuitry operates at a second frequency lower than the first frequency and generates a clock selection signal at that second frequency. A synchronizing circuit synchronizes the lower frequency clock selection signal with the first frequency clock signal. The synchronized lower frequency clock selection signal selects one of the first and second clocks. The first and second clocks may be resident with respective first and second processors capable of operating in plural modes such as a parallel synchronous mode and an asynchronous stand-alone mode. Each processor also includes electronic circuitry that operates at the second frequency and generates a clock selection signal that selects one of the clocks to clock one or both of the processors in response to a change in the operating mode. One of the processors is designated as a clock controlling processor, and the other processor is designated as a clock following processor operating N clock cycles behind the clock controlling processor. In response to a mode change, the electronic circuitry designates the other processor as the clock controlling processor so that the one processor becomes the clock following processor.

BRIEF DESCRIPTION OF THE DRAWINGS

The novel features believed characteristic of the invention are set forth in the appended claims. Those features as well as other features and advantages thereof will be best understood by reference to the following description of the preferred embodiment when read in conjunction with the accompanying figures, wherein:

DETAILED DESCRIPTION OF THE EMBODIMENTS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
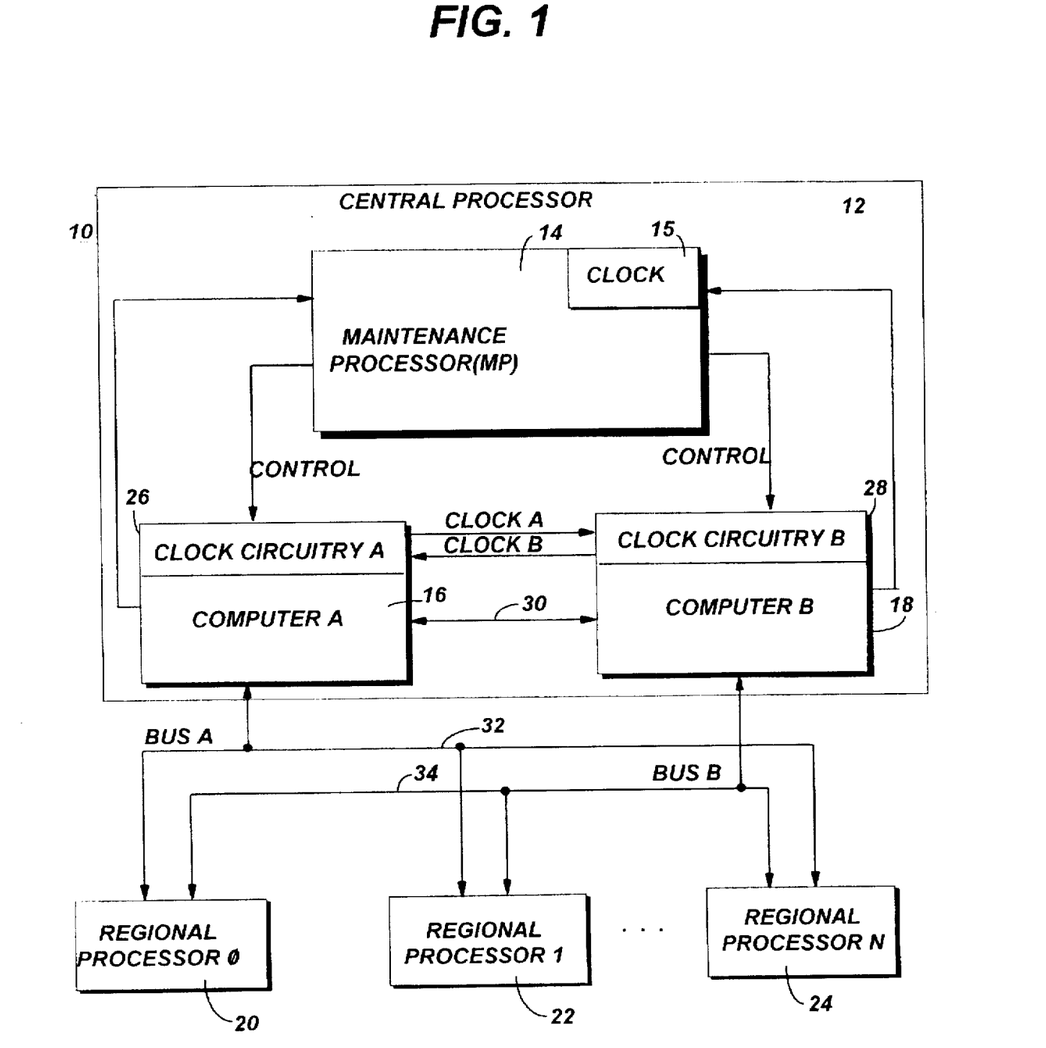
FIG. 1 is a function block diagram of a data processing system to which the present invention may be applied.

FIG. 1 illustrates one particular example application of the present invention. A data processing system 10 suitable for controlling, for example, a telephone network includes a central processor 12 that controls several regional processors 20, 22, and 24 which in turn control multiple telephone network operations, e.g., call set up, routing, etc. The central processor must function at very fast speeds to maximize the telephone switching capacity but also must function reliably to provide continuous network operation. To ensure reliability, computers 16 and 18, labelled for purposes of description as computer A and computer B, operate in parallel and synchronously. Computers 16 and 18 communicate together over a common bus 30 and with regional processors 20–24 through dedicated buses 32 and 34. Both computers include a central processing unit (CPU), memory, and clock circuitry indicated at 26 and 28, respectively. The clock circuitry at each computer includes an oscillator which operates independently of the other computer's oscillator to generate a high frequency clocking signal, e.g., a 40 MHz clocking signal.

The clocking signals A and B are provided to both computers. For example, the oscillator in computer A provides a clocking signal A to the CPU in computer A as well as a clocking signal A to the clock circuitry 28 in computer B. Computer B is similarly configured. A supervisory or maintenance processor (MP) 14 includes its own clock 15 and may be for example an inexpensive microprocessor operating at a relatively low clock speed, e.g., 16 MHz. Using control signals from maintenance processor (MP) 14, both sets of clock circuitry 26 and 28 determine in parallel the mode or state of the computers and which clock signal will be selected to operate computers A and B.

In a normal mode of operation, computer A and computer B operate in parallel synchronous fashion thereby providing redundant and reliable control of regional processors 20–24. Both computer A and computer B perform the same sequence of operations in parallel. Although not necessary, in a preferred embodiment, the two computers execute the identical instruction synchronously but slightly offset in time. That is, one computer operates N clock cycles ahead of the other computer, with a suitable value of N being for example four clock cycles. In synchronous operation, both computers use the same clock signal generated by one of the computers. Based on control signals from the maintenance processor 14, the clocking circuitry, 26 and 28 in both computers determines which computer's clocking signal will be used to clock both computers. For convenience, the computer whose clock/oscillator is selected to provide clocking signals to both computers is sometimes referred to as the clock controlling computer or the "executive" computer.

The maintenance processor 14 monitors the operation of computers A and B and generates state control signals that determine their specific mode/state of operation. If the computers are operating in a parallel synchronous mode, the standby computer buffers the outputs (e.g., operands) generated by the executive computer. Outputs from the executive computer are delayed N cycles and compared with the outputs from the standby computer. If there is a mismatch, the maintenance processor 14 receives an error signal from the standby computer and may conclude that one of the computers is faulty, send appropriate control signals to the clock circuitry 26 and 28 of both computers to halt the faulty computer, and switch the state of operation of the still functioning computer to a stand-alone state/mode of operation. In that instance, the now independently operating computer necessarily runs on its own clock signal. When the faulty computer is repaired, it is brought back on line with the maintenance processor 14 sending the appropriate control signals to the clocking circuitry 26 and 28 of both computers to bring them back into parallel synchronous operation. In order to perform this latter state transition, the currently operating clock in the stand-alone operating computer is stopped for a predetermined delay time, and then the clock in the now executive computer is restarted with the clock signals being provided to the other computer. Since both computers are clocked at the same time using the same clock signal, synchronous operation is achieved. Moreover, the executive computer transfers microinstruction addresses and operands via bus 30 to the standby computer which buffers them for N clock cycles and then executes them during an update mode. In this way, the computers are brought into synchronous operation with the executive computer N cycles ahead of the standby computer.

With the present invention, these kinds of state transitions are performed in a very short time while still achieving reliable high speed synchronous operation. The clock circuitry of each computer operates at a second frequency lower than the first frequency and generates a clock selection signal that selects one of the clocks from the first and second processors to clock both of the computers. In response to the control signals from maintenance processor 14 indicating a mode change, the clock circuitry in each computer generates clock switching control signals at that lower frequency. The lower frequency clock signals are reclocked with extremely short reclocking delay so that they are synchronous with the first frequency clock signals. As a result, clock switching operations between high frequency clocks occur with minimal glitches despite the fact that the clock selection control signals are generated at a lower frequency than the high frequency clocking signals.

Figure 2:
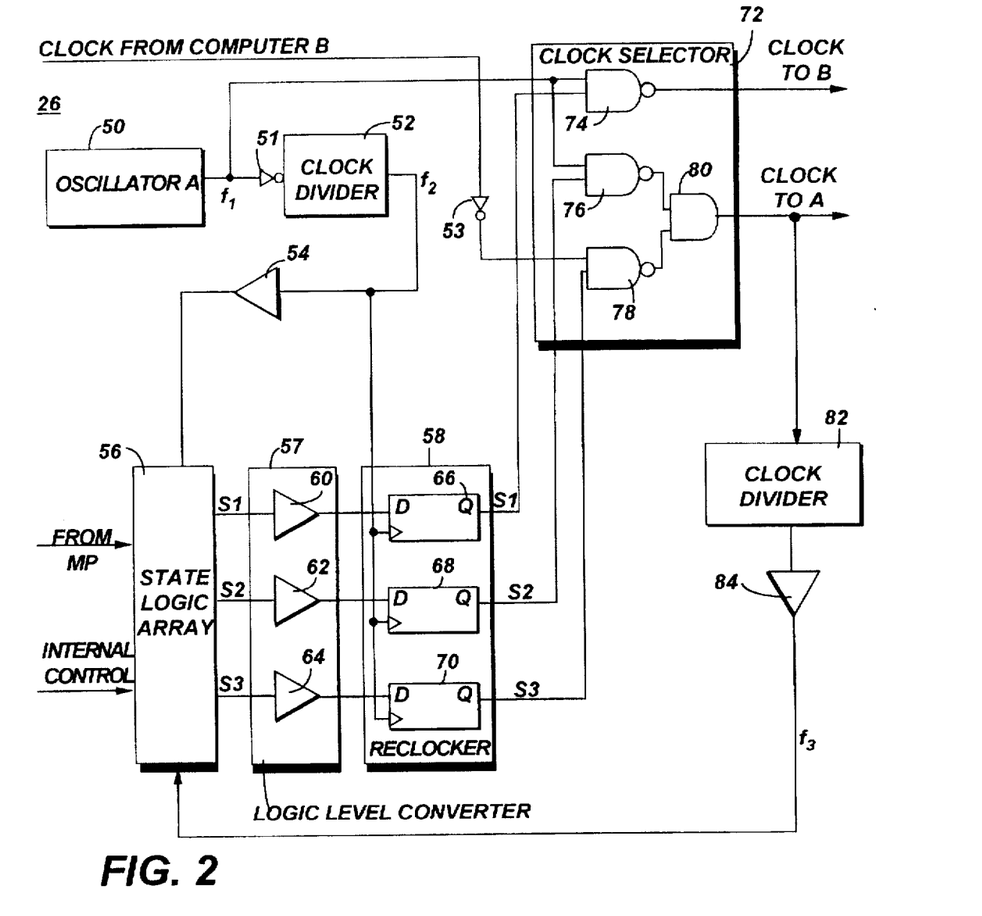
FIG. 2 is a function block diagram of particular clock switching circuitry which may be used in an example embodiment of the present invention.

In another more detailed, example embodiment, FIG. 2 illustrates an example hardware implementation of the clock circuitry 26 from computer A 16. The clock circuitry B is substantially the same. Of course, other hardware and/or software implementation could be used. A primary purpose of the clock circuitry is to select one of the high frequency clocks and provide with minimum clock switching delay the high frequency clock signal to both computers.

The clock circuitry includes an oscillator 50 for generating a relatively high frequency (f1) clock signal for clocking one or both of the computers at high speed. In one nonlimiting example, f1 is 40 MHz. A clock divider 52 and a clock selector 72 are connected to the oscillater 50. Clock divider 52 includes an inverting input terminal 51 which generates a lower frequency (f2) signal that is 180° out of phase with and an integral multiple of f1, e.g., f1 is divided by two to generate f2 at 20 MHz. An analogous f1 clock signal output from computer B is inverted in inverter 53 and input to the clock selector 72. Clock selector 72 is essentially a high speed multiplexer which selects one of the clock signals received from both the computers based on state signals S1–S3. Such a multiplexer may be constructed using three NAND gates 74, 76, and 78, and AND gate 80.

A state logic array 56 receives mode determining control signals from the maintenance processor 14 and possibly other control signals internal to the clock circuitry. Because of the present invention, the state logic array 56 may be constructed using relatively low power and inexpensive integrated logic circuits that run using a much slower clock. For example, array 56 may be constructed using CMOS circuits which employ well known transistor-transistor logic (TTL) integrated circuits. While CMOS circuits are quite satisfactory for purposes of implementing the state logic array, their switching speed between logic levels is relatively slow, i.e., on the order of 50 nanoseconds. As described in more detail below, when such slow switching speed circuitry generates clock control signals to switch clocks operating at considerably higher frequencies, undesirable "glitches" may occur.

To be more compatible with the high frequency oscillator 50, circuits other than the state logic array 56, like the clock selector 72, operate at higher switching speeds using, for example, emitter coupled logic (ECL) integrated circuitry. In addition to faster switching speeds, ECL circuits operate at a different set of logic voltage levels than TTL circuits. Therefore, logic conversion buffer 54 buffers the f2 clock signal output from ECL clock divider 52 and converts that signal into a corresponding TTL clock signal which clocks the TTL state logic array 56 at frequency f2.

The state logic array 56 may be a programmed logic array (PLA) constructed with discrete, slower switching speed, TTL integrated circuits in a particular configuration to generate a specific set of state control signals in response to mode determining signals from the maintenance processor 14. While all of the state logic array 56 may operate at frequency f2, there may be circumstances where another third and even lower frequency f3 clocking signal, e.g., 10 MHz, drives a portion of the state logic array 56. This third TTL clocking signal f3 may be generated by dividing the ECL f1 clock signal A being sent to operate computer A in a clock divider 82, e.g., a divide by four circuit. The output of the divider 82 is converted by logic level converter 84 into TTL before provided to state logic array 56. Again, a significant advantage of the present invention is that inexpensive relatively slow electronic circuits can be used to control much faster but more expensive clock switching circuitry and computers.

The TTL state signals S1–S3 output from state logic array 56 are converted to ECL in a logic level converter 57 including individual conversion buffers 60, 62, and 64 similar to conversion buffer 54 described above. The low frequency logic level converter 57 outputs are connected to an ECL synchronizing or reclocking device 58 for reclocking using the lower frequency clock signal f2 which is 180° out of phase with and a multiple of the higher frequency clock signal f1. As a result of this reclocking, the relatively slow speed state signals S1–S3 are synchronized with the faster computer clock signals. In other words, the rising and falling edges of higher frequency clock signal f1 align with the rising and falling edges of lower frequency f2 state signals S1–S3. To prevent glitches in clock switching, the reclocker 58 synchronizes S1–S3 with the f1 clock signal during the logic 0 half cycle of the f1 clock signal. Accordingly, clock divider 52 operates on the negative or falling edge of clock signal f1.

Because the state signals S1–S3 are reclocked using fast switching logic devices such as the three ECL type D-type flip-flops 66, 68, and 70 in clock selector 72, the time delay required to synchronize the state signals S1–S3 with the f1 clock signals is substantially minimized. In this example, using TTL gates to reclock the state signals S1–S3 requires a delay on the order of 50 nanoseconds which is a significant "glitch" in any clock switching operation. On the other hand, using ECL gates to reclock the signals S1–S3 requires a much smaller delay on the order of a nanosecond before the reclocked outputs are provided to clock selector 72 to effect a clock switching operation. In addition, reclocking the state signals when clock signal f1 is low avoids possible glitches which might otherwise occur when those state signals change state at the clock selector 72, as described earlier.

Clock selector 72 selects one of the two clocks to provide high frequency clocking signals to both computers A and B. More specifically, when the maintenance processor 14 commands a mode or state change which requires a clock switching operation, the state logic array 56, in response to state control signals processed using lower frequency clocking signals f2 (or f2 and f3), generates corresponding state signals S1–S3 for executing the clock switch at clock selector 72. To ensure that the clock switch takes place in sync with the high frequency f1 system clocking signal, the state signals S1–S3 are reclocked in reclocker 58. The unavoidable delay encountered in the reclocking operation is truly minimized in the present invention using fast switching ECL transistor circuits with logic level converter 57 being used to convert the TTL logic level of the signals S1–S3 generated by the slower switching TTL transistor circuits used in the state logic array 56.

Synchronized state signal S1 is input along with the f1 clocking signal from computer A oscillator 50 to NAND gate 74 in clock selector 72. Synchronized control signal S2 is input along with the f1 clocking signal from computer A oscillator 50 to NAND gate 76. Synchronized state signal S3 is input along with the inverted f1 clocking signal from computer B oscillator 50 to NAND gate 78. The outputs of NAND gates 76 and 78 are the inputs to AND gate 80. The output of NAND gate 74 is the clocking signal provided to computer B (assuming computer A's clock signal is selected), and the output of AND gate 80 is the clocking signal provided to computer A irrespective of which computer's clock signal is selected.

Figure 3:
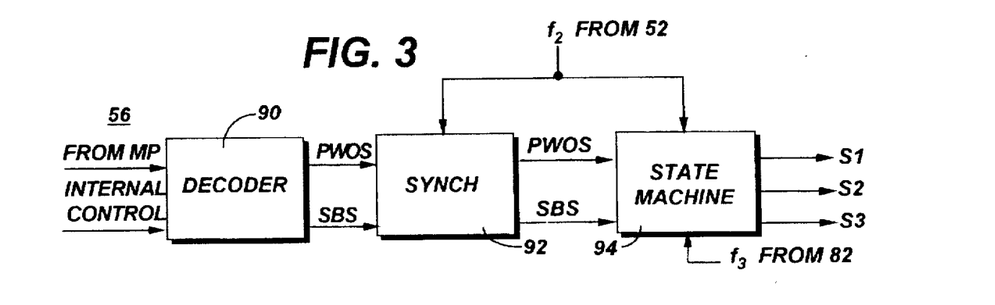
FIG. 3 is a function block diagram of the state logic array shown in FIG. 2.

Referring to FIG. 3, a more detailed block diagram of one possible configuration for the state logic array 56 in FIG. 2 is illustrated. Control signals from the maintenance processor 14 and internal to the clocking circuitry are decoded in a decoder 90 to produce state control signals PWOS and SBS. State control signal PWOS indicates that both computers A and B are to work in a parallel synchronous mode or state of operation. State control signal SBS indicates if the computer (A or B) is to work in a standby state of operation. Since the maintenance processor 14 may operate at a frequency different than f2, e.g., 16 MHz, the state control signals are synchronized in a sync block 92 to the f2 clock signal in the clock divider 52. The synchronized state control logic signals PWOS and SBS then are input to a state machine 94 which may include a combination of discrete logic gates connected to implement a specific state table. Those logic gates, based on the combination of input logic states of state control logic signals PWOS and SBS, produce state signals S1–S3. The logic circuitry of state machine 94 is also clocked with f2 from clock divider 52.

Figure 4A:
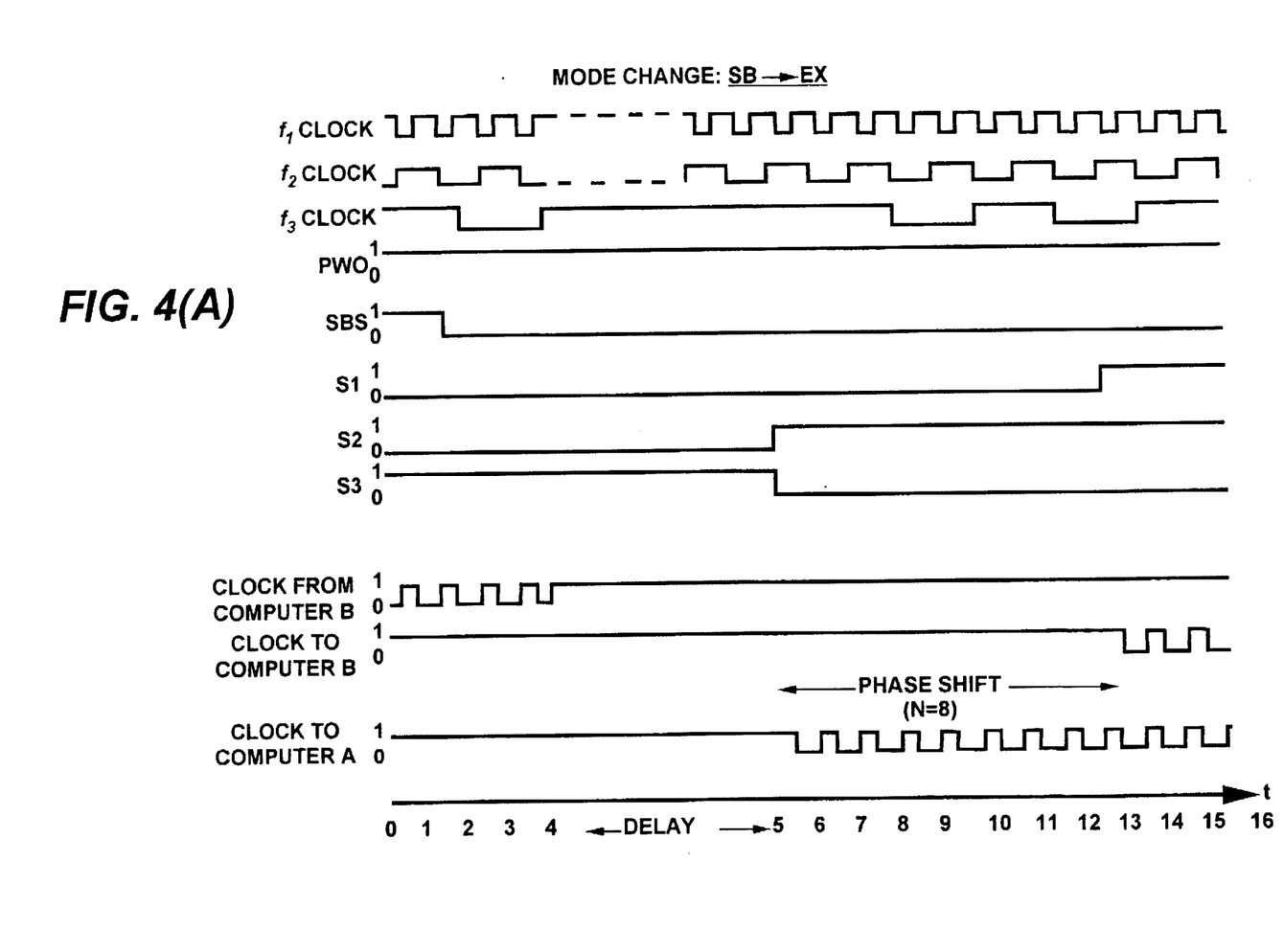
FIGS. 4(a)–4(c) are timing diagrams which illustrate an example of various clocking and clock switching control signals in accordance with various state transitions.
Figure 4B:
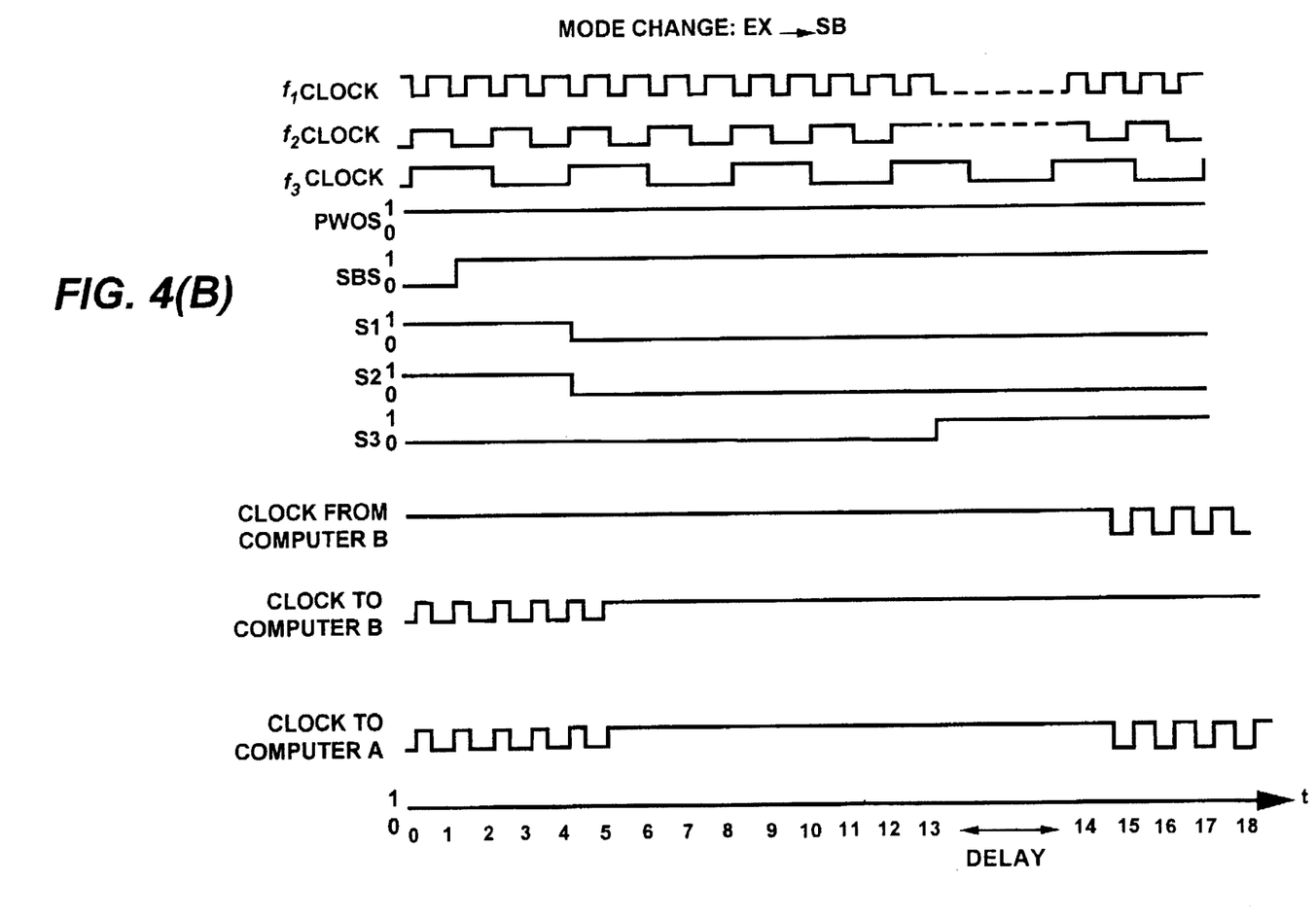
Figure 4C:
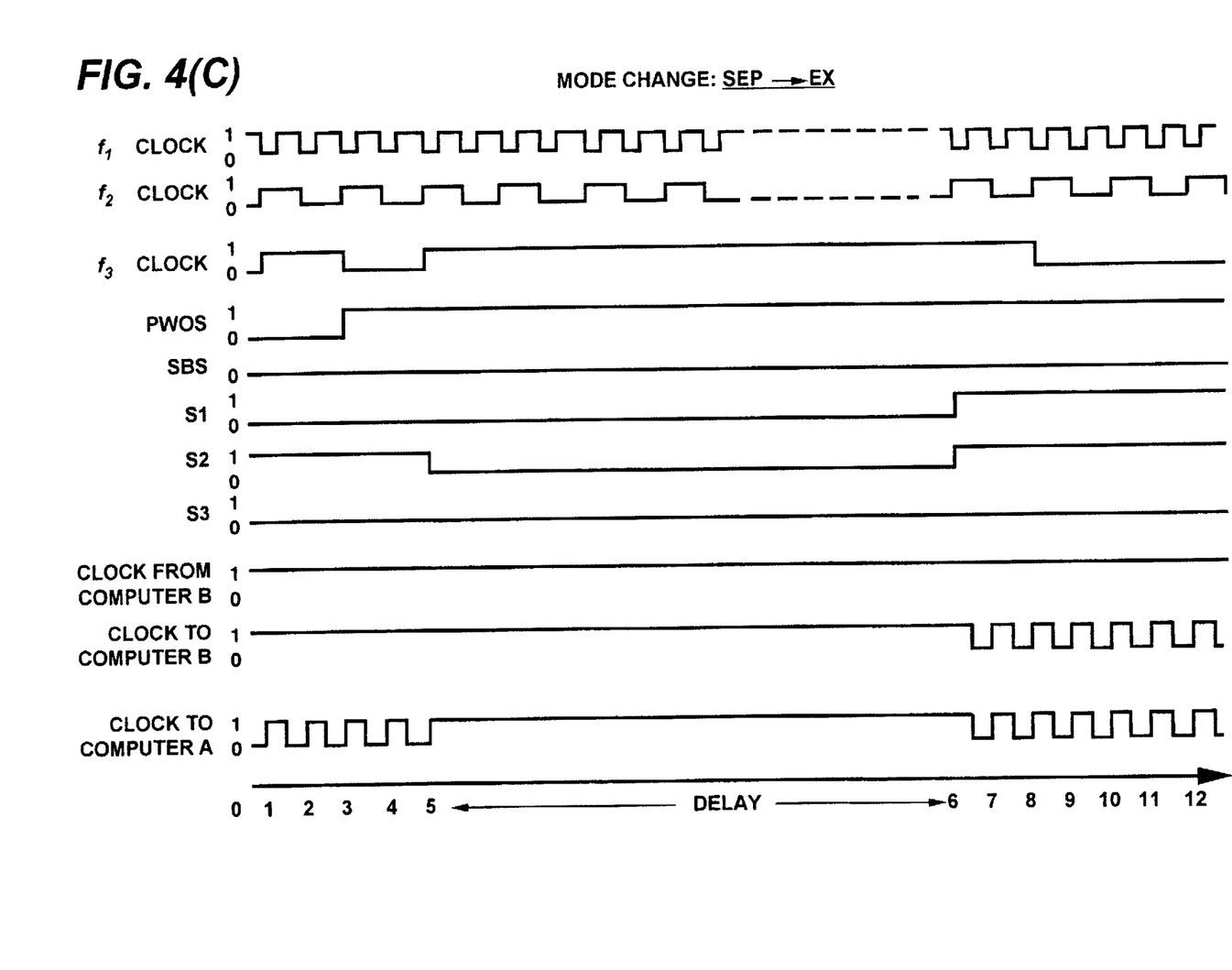

The timing diagrams in FIGS. 4(a)–4(c) illustrate the relationships between the f1, f2, and f3 clock signals, the state control logic signals PWOS and SBS, the state signals S1–S3, and the clock signals to computers A and B, and various example mode changes that require a clock switching operation. The first three waveforms represent the three oscillator signals f1, f2, and f3. In this example, f1=2 f2=4f3. For consistency with FIG. 2, the PWOS and SBS state control signals and the S1–S3 state signals are shown next. The final three waveforms include the clock signal from computer B, the clock signal to computer B, and the clock signal to computer A FIG. 4(a) illustrates a particular example where at time 0 the computers A and B are operating in a parallel synchronous mode of operation with executive computer B providing the high speed clocking signal f1 to both computers with computer A currently being the standby (SB) computer. However, at time 1 a mode change occurs as indicated by the shift in the SBS state control signal from a logic high level to a logic low level. This indicates computer A is to now become the executive and the computer B (previously the executive) is to become the standby. Accordingly, computer B stops sending its clock signal as a result of control signals generated by its own control clock circuitry 28 at time 4. A predetermined fixed delay period must be waited for the mode/state changing control signals to be received and processed in the state logic array 56 of the control clock circuitry. At time 5, those control signals have been processed, and the state transition signals S1–S3 which control the clock switch are generated. Thus, at time 5, state signal S2 goes from a logic low level to a logic high level, and state signal S3 goes from a logic high level to a logic low level. Also at time 5, the clock signal generated in computer A (now the executive) begins and commences operation of computer A. The clock signal from computer A to computer B is not transmitted until time 13 (8 clock cycles later) as indicated by the change in logic level of state control signal S1. This delay essentially corresponds to a phase shift of two times the N cycle offset between executive computer A and standby computer B. In the example, N=4.

FIG. 4(b) shows a timing diagram for an example mode/state transition where computer A is switched from executive to standby. State control signal SBS changes logic level at time 2 with the corresponding state transition signals being generated at time 5. At time 5, clock signals from computer A are no longer delivered to computer A or computer B. From time 5 to 13, computer A prepares to receive clock signals from computer B. At the same time, control signals in the clock circuitry of computer B are processed. At time 13 the state transition signal S3 goes from a logic low to logic high level indicating that computer A is ready to receive clock pulses from computer B. Since computer B is now the executive computer, it operates four cycles ahead of computer A. Therefore, there is a phase shift delay of four cycles during the time delay before computer A receives clock signals from clock B at time 14.

FIG. 4(c) is a timing diagram which shows the timing for computer A operating in a stand-alone, independent mode switched to operate as the executive computer in a parallel synchronous mode with computer B. The state control signal PWOS shifts from a low to high logic level at time 3. State transition (clock switching) signals are generated at time 5, i.e., S2 goes from a high logic level to a low logic level, indicating that computer B is ready to resume parallel synchronous operation with computer A. After the predetermined delay, state transition signals S1 and S2 change logic level at time 6 which starts the clock signal in computer A. At the same time, the clocking signal from clock A is sent to computer B to ensure synchronous operation.

Although not illustrated as specific timing diagrams, clock switching operations are also required when stand-alone computer A resumes parallel synchronous operation with computer B but becomes the standby computer rather than the executive computer. Another mode includes the change of a computer operating synchronously being converted to stand-alone operation.

Figure 5:
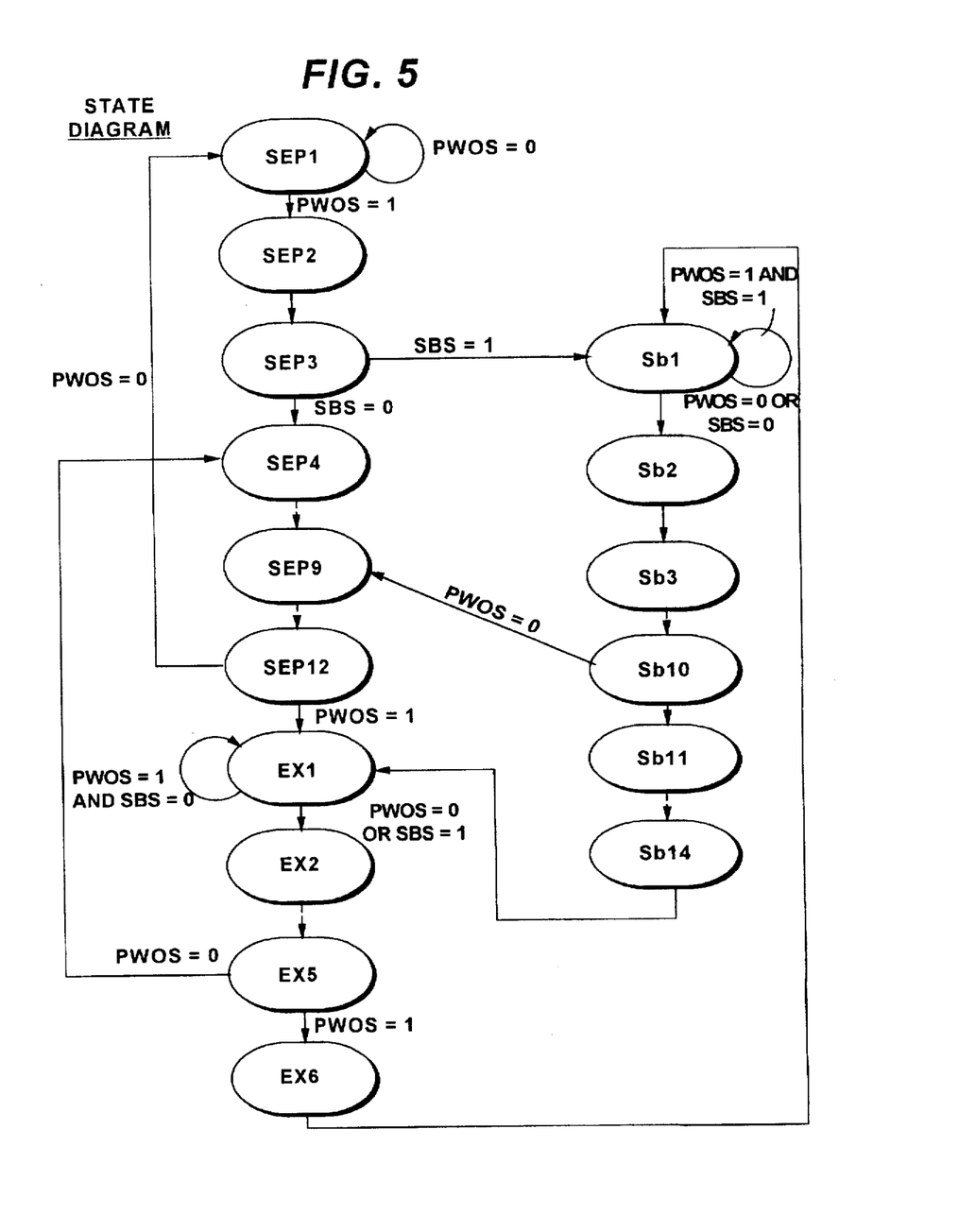
FIG. 5 is an example state diagram illustrating various states that parallel processors may assume and transitions therebetween.

Reference is now made to FIG. 5 which illustrates a state diagram of various possible states of operation for the state logic arrays for computers A and B. Each circle represents a particular mode/state of the computers A and B. Each line between circles represents a change of state. Some of the changes of state occur automatically or after a predetermined time period expires. Other state transitions require a particular logic level state control signal. For example, to change from state SEP1 to state SEP2, the state control signal PWOS must change from a logic zero to a logic one. If PWOS remains zero, there is no state change with the state remaining at SEP1. In state SEP3, there are two possible state transitions: to state SBS1 if state control signal SBS equals a logic one or to state SEP 4 if state control signal SBS equals a logic zero.

State SEP1 corresponds to both the computers operating in a separate stand-alone state which may occur for example when the other computer is faulty and/or has been taken off line. State EX1 corresponds to the state where the computer whose clock circuitry is implementing the state diagram is the executive providing clock signals to both computers. State SB1 corresponds to the state where this computer is the standby receiving its clocking signal from the other computer.

Figure 6:
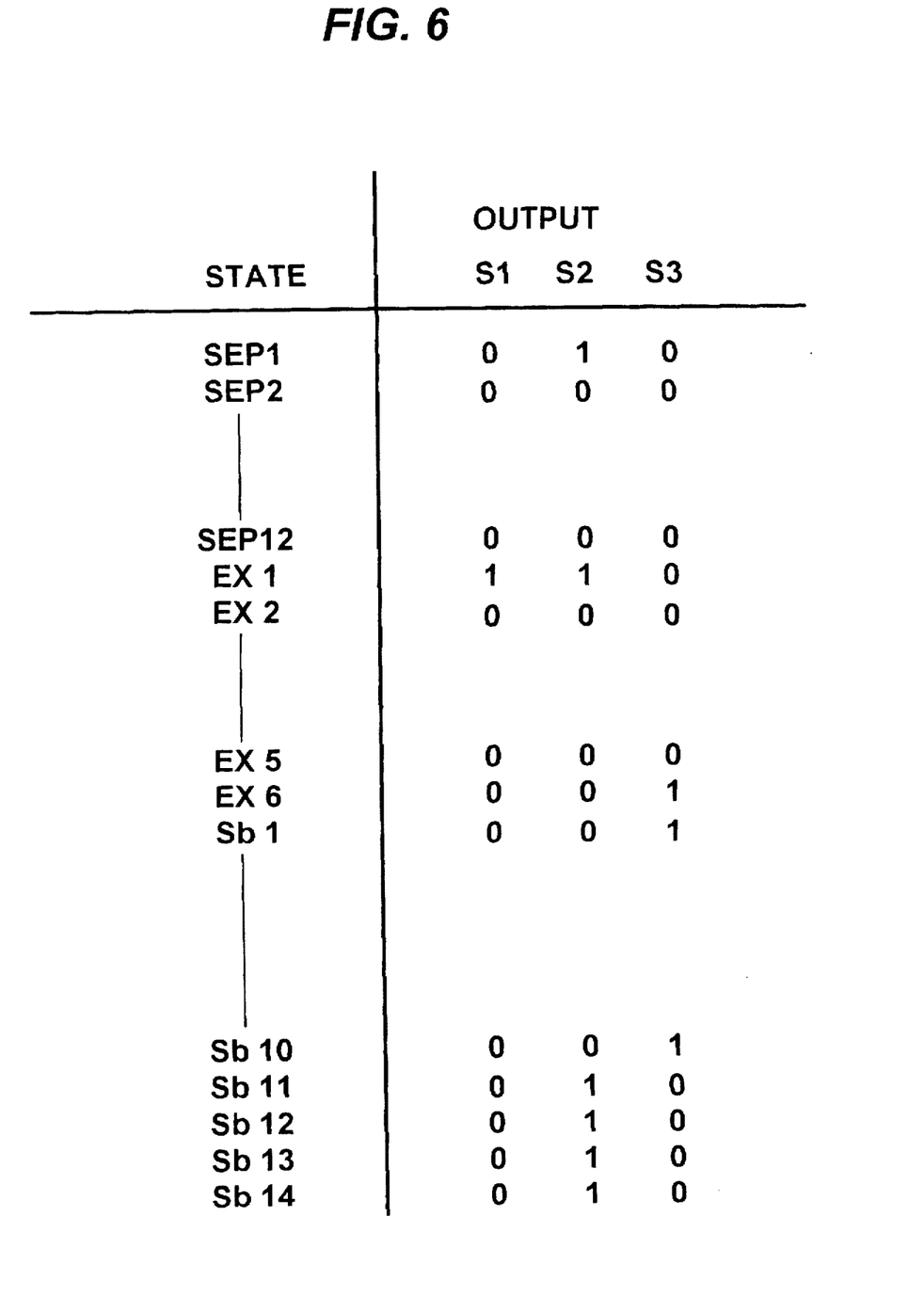
FIG. 6 is a table which illustrates for each state shown in the state diagram of FIG. 5 corresponding state control signals.

FIG. 6 shows in table form for each specific state of operation of the computers a corresponding set of state signals S1, S2, and S3. For example, state SEP1 corresponds to state signals S1=0, S2=1, and S3=0. When state control signal PWOS changes from a zero logic level to a one logic level, these state signals change: S1=0, S2=0, and S3=0. The state signals S1–S3 do not change due to the fixed delay waiting period between states SEP 2 and SEP 12, between states EX2–EX5, and between states SB1 and SB10. Moreover, the transitions between states SB11 and SB14 are driven by internal timers to provide the four cycle offset between the executive computer and the standby computer.

Various functions performed by clock control circuitry of each computer A and B may of course be implemented using software algorithms executed by a suitably programmed microprocessor, a digital signal processor, or an application specific integrated circuit (ASIC). For example and as is well known in the data processing art, the functions illustrated in the state diagram in FIG. 5 and represented in the state table in FIG. 6 may be implemented using microcode, assembler code, or high level programming languages. Using programmed or discrete logic that operates at a lower frequency means the state transition signals controlling clock switching/selection can be generated using readily available and inexpensive electronic circuitry. Of course, while a specific example of a state diagram and state signals is provided in FIGS. 5 and 6 for purposes of assisting in the description of the invention, other state diagrams and tables for implementing other desirable state transitions could also be readily implemented. Moreover, the state logic array can be easily and inexpensively modified to flexibly accommodate changes in the state diagram/table in the sense that a state diagram implemented with an inexpensive programmable circuit may be readily reprogrammed, and an inexpensive discrete logic array could simply be easily and cost effectively replaced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus comprising:
   first and second processors capable of operating in plural modes, each processor including:
   a clock selectively providing a first frequency clock signal to the first and second processors, and
   electronic circuitry, operating at a second frequency lower than the first frequency, generating a clock selection signal at the second lower frequency that selects one of the clocks from the first and second processors to clock one or both of the processors in response to a change in the operating mode of the processors.

2. The apparatus in claim 1, wherein the processors are capable of operating in a synchronous mode and an asynchronous stand-alone mode.

3. The apparatus in claim 1, wherein in a synchronous mode of operation, one of the processors is designated as a clock controlling processor and the other processor is designated as a clock following processor, and in response to a mode change, the electronic circuitry changes the other processor to the clock controlling processor and the one processor to the clock following processor.

4. The apparatus in claim 3, wherein the electronic circuitry in the clock controlling processor stops its clock in response to the mode change, and after a predetermined time period, the clock following processor becomes the clock controlling processor and provides clocking signals to both processors.

5. The apparatus in claim 4, wherein the clock controlling processor operates N clock cycles ahead of the clock following processor.

6. The apparatus in claim 1, wherein the electronic circuitry includes:
   a clock selector receiving clocking signals from both processors and selecting one of the clocking signals to operate both of the processors, and
   a clock switching controller operating at the lower frequency clock signal for receiving mode change signals and providing a clock control signal to the clock selector.

7. The apparatus in claim 6, wherein the clock switching controller includes:
   an array of logic devices for generating various clock control state signals at the lower frequency, and
   a reclocking circuit for reclocking the lower frequency clock control state signals synchronous with the first frequency clocking signals.

8. The apparatus in claim 7, wherein the reclocking circuit reclocks the clock control state signals with a delay on the order of 1–2 nanoseconds.

9. The apparatus in claim 7, the clock switching controller further comprising:
   a logic level converter for converting the logic level of the clock control state signals to another logic level.

10. An apparatus comprising:
    first and second processors capable of operating in parallel in a synchronous mode and separately in an asynchronous mode, and
    a supervisor processor for monitoring the mode of operation of the processors and changing the processors from the synchronous mode to the asynchronous mode when an error in synchronous operation is detected,
    wherein each processor includes:
    a clock, operating at a first frequency, selectively providing a first frequency clock signal to the first and second processors, and
    clock selection circuitry, operating at a second frequency slower than the first frequency, for generating a clock selection signal that selects one of the clocks from the first and second processors to clock one or both of the processors in response to a change in the operating mode of the processors.

11. The apparatus in claim 10, wherein the supervisor processor operates at a frequency that is less than or equal to one half of the first frequency.

12. The apparatus in claim 11, wherein the synchronous mode of operation, the clock of one of the first and second processors is selected to clock both of the processors and the supervisor processor compares the output from the first and second processors and changes the mode of operation from synchronous to asynchronous when the outputs do not match.

13. The apparatus in claim 12, wherein when the supervisor processor halts one of the processors, the other of the processors operates asynchronously using its own clock signals, and when the one processor is brought back into synchronous operation, the processor clocks are stopped for a predetermined time delay, and thereafter synchronous operation is resumed using one of the processor's clock signals to operate both processors.

14. An apparatus comprising:
    first and second clocks providing a first frequency clock signal;
    electronic circuitry, operating at a second frequency lower than the first frequency, generating a clock selection signal at the second frequency that selects one of the first and second clocks, and a synchronizing circuit operating at the second lower frequency to synchronize the second lower frequency clock selection signal with the first frequency clock signal, wherein the synchronized lower frequency clock selection signal selects one of the first frequency clock signals generated by the first and second clocks.

15. The apparatus in claim 14, wherein the synchronizing circuit includes:

a logic array having a first logic type that receives control signals and generates state signals at the lower frequency, and a reclocking circuit for reclocking the state signals at the lower frequency synchronous with the first frequency clock signal.

16. The apparatus in claim 15, wherein the synchronizing circuit includes:

a logic converter for converting the first logic type state signals into second logic type signals.

17. A method comprising the steps of:

generating first and second clock signals at a first frequency;

generating a clock selection signal that selects one of the clock signals at a second lower frequency;

synchronizing the clock selection signal with the first frequency clock signals using a third clock signal generated at the second frequency; and selecting one of the clock signals using the clock selection signal.

18. The method in claim 17, wherein the second frequency is one half or less the first frequency.

19. The method in claim 17, wherein the synchronizing step synchronizes the clock selection signal with the clock signals in several nanoseconds or less.

20. A method for operating first and second parallel processors in plural modes, each processor having its own independent high speed clock connected to selectively supply high speed clocking signals to the parallel processors and its own clock switching circuitry for selecting which high speed clocking signal clocks that processor in a particular operational mode, comprising the steps of:

designating the first processor to provide the high speed clocking signal to both the first and second processors from the first processor's clock;

operating the first processor synchronous with the second processor;

providing control signals to the clock switching circuitry in both processors designating the second processor to provide the high speed clocking signal to both the first and second processors; and processing the control signals in the clock switching circuitry at a speed substantially slower than the high speed clocking signal to output clock select signals at the substantially slower speed that select the high speed clocking signal from the second processor to clock the first and second processors.

21. The method in claim 20, wherein when one of the processors is removed from synchronous operation, the method further comprises the steps of:

operating the other of the processors asynchronously using its own high speed clocking signal.

22. The method in claim 20, wherein the first processor providing the high speed clocking signal to both the first and second processors is N clock cycles ahead of the second processor.

23. The method in claim 22, further comprising:

generating a signal that changes the processor which provides the high speed clocking signals;

stopping the clocks of both processors for a predetermined delay;

generating the high speed clocking signal at the second processor; and providing the high speed clock signal to the first processor after a 2*N cycles delay.

24. The method in claim 20, wherein the processing step further comprises:

reclocking the clock selection signal with a clocking signal at the lower speed to synchronize the clock selection signal with the high speed clocking signal.

25. The method in claim 24, wherein the reclocking step synchronizes the clock selection signal with the high speed clocking signals in several nanoseconds or less.

* * * * *